United States Patent
Tsirkin

(10) Patent No.: US 10,310,872 B2
(45) Date of Patent: Jun. 4, 2019

(54) TRANSPARENT FAST APPLICATION LAUNCHER

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 152 days.

(21) Appl. No.: 15/438,086

(22) Filed: Feb. 21, 2017

(65) Prior Publication Data

US 2018/0239620 A1    Aug. 23, 2018

(51) Int. Cl.
G06F 9/445    (2018.01)
G06F 9/455    (2018.01)
G06F 9/48     (2006.01)

(52) U.S. Cl.
CPC ...... *G06F 9/44521* (2013.01); *G06F 9/45558* (2013.01); *G06F 9/4843* (2013.01); *G06F 2009/45562* (2013.01)

(58) Field of Classification Search
CPC ........ G06F 9/44; G06F 9/445; G06F 9/44505; G06F 9/4451; G06F 9/44521; G06F 9/44526; G06F 9/4843
USPC ...................................... 717/162–164; 718/1
See application file for complete search history.

(56) References Cited

U.S. PATENT DOCUMENTS

| | | | |
|---|---|---|---|
| 5,692,129 A | 11/1997 | Sonderegger et al. | |
| 6,536,041 B1 * | 3/2003 | Knudson | H04N 21/235 725/39 |
| 7,010,757 B2 | 3/2006 | Stana et al. | |
| 7,770,134 B2 | 8/2010 | Evans et al. | |
| 8,104,049 B2 * | 1/2012 | Chandran | G06F 9/4486 719/331 |
| 8,122,280 B2 * | 2/2012 | Ngan | G06F 11/1438 714/1 |
| 8,291,486 B2 * | 10/2012 | Morimoto | H04L 63/1408 709/213 |
| 8,589,953 B1 * | 11/2013 | Havemose | G06F 11/2041 719/319 |

(Continued)

FOREIGN PATENT DOCUMENTS

CN        105893065 A    8/2016

OTHER PUBLICATIONS

Speed up KDE Application Loading Under Gnome (1 page) Link: http://www.stchman.com/kde_fast.html.

(Continued)

*Primary Examiner* — Andrew M. Lyons
(74) *Attorney, Agent, or Firm* — K&L Gates LLP

(57) ABSTRACT

Methods and apparatus for a transparent fast application launcher are disclosed. For example, an executable loader receives a first request to load and then loads a first copy of an executable program into a memory, including resolving and loading at least one shared library associated with the executable program to the memory. A local socket is associated with the first copy of the executable program. An entry indicative of the local socket and the first executable program is recorded in an executable database. The executable loader receives a second request to load a second copy of the executable program and then connects to the local socket as a client to send a third request to the local socket based on the second request to launch the second copy of the executable program, resulting in the second copy of the executable program executing.

20 Claims, 4 Drawing Sheets

(56) References Cited

U.S. PATENT DOCUMENTS

| | | | | |
|---|---|---|---|---|
| 8,600,726 | B1* | 12/2013 | Varshney | H04L 69/18 |
| | | | | 703/26 |
| 8,726,078 | B1* | 5/2014 | Havemose | G06F 11/1438 |
| | | | | 714/15 |
| 8,732,182 | B2 | 5/2014 | Bethlehem et al. | |
| 8,935,317 | B2* | 1/2015 | Jain | G06F 9/5072 |
| | | | | 709/203 |
| 8,943,501 | B1* | 1/2015 | Havemose | G06F 9/4856 |
| | | | | 718/1 |
| 9,032,193 | B2 | 5/2015 | Joshi et al. | |
| 9,069,782 | B2* | 6/2015 | Yang | G06F 17/30091 |
| 9,135,127 | B1* | 9/2015 | Havemose | G06F 11/1451 |
| 9,189,645 | B2* | 11/2015 | Borzycki | G06F 21/6218 |
| 9,213,654 | B1* | 12/2015 | Havemose | G06F 11/1482 |
| 9,405,633 | B1* | 8/2016 | Havemose | G06F 11/1451 |
| 9,442,752 | B1* | 9/2016 | Roth | G06F 9/45558 |
| 9,508,040 | B2 | 11/2016 | Bilal et al. | |
| 9,626,212 | B2* | 4/2017 | Beveridge | G06F 9/45558 |
| 2004/0111720 | A1* | 6/2004 | Vertes | G06F 9/4486 |
| | | | | 717/164 |
| 2005/0114633 | A1* | 5/2005 | Palat | G06F 9/44521 |
| | | | | 712/226 |
| 2005/0138623 | A1* | 6/2005 | Fresko | G06F 9/4843 |
| | | | | 718/102 |
| 2005/0223018 | A1* | 10/2005 | Forin | G06F 9/4411 |
| 2005/0226406 | A1* | 10/2005 | Forin | G06F 9/44521 |
| | | | | 380/1 |
| 2007/0256087 | A1* | 11/2007 | Forin | G06F 9/4411 |
| | | | | 719/332 |
| 2007/0288944 | A1* | 12/2007 | Kato | G06F 9/44521 |
| | | | | 719/331 |
| 2009/0013163 | A1* | 1/2009 | Cheng | G06F 9/44521 |
| | | | | 713/1 |
| 2009/0094610 | A1* | 4/2009 | Sukirya | G06F 9/5083 |
| | | | | 718/105 |
| 2009/0228970 | A1* | 9/2009 | Morimoto | H04L 63/10 |
| | | | | 726/12 |
| 2011/0093849 | A1* | 4/2011 | Chawla | H04L 41/0816 |
| | | | | 718/1 |
| 2012/0240112 | A1* | 9/2012 | Nishiguchi | G06F 9/45558 |
| | | | | 718/1 |
| 2013/0091203 | A1* | 4/2013 | Araki | G06F 9/547 |
| | | | | 709/203 |
| 2013/0263101 | A1* | 10/2013 | Dawson | G06F 9/5044 |
| | | | | 717/157 |
| 2013/0263153 | A1* | 10/2013 | Gschwind | G06F 9/4484 |
| | | | | 719/313 |
| 2014/0082516 | A1* | 3/2014 | Huang | G06F 3/0484 |
| | | | | 715/746 |
| 2014/0173700 | A1* | 6/2014 | Awan | H04L 63/107 |
| | | | | 726/4 |
| 2014/0282457 | A1* | 9/2014 | Chow | G06F 8/54 |
| | | | | 717/164 |
| 2015/0339367 | A1* | 11/2015 | Stam | H04L 67/10 |
| | | | | 707/645 |
| 2015/0347162 | A1* | 12/2015 | Ahmad | G06F 9/44521 |
| | | | | 717/162 |
| 2016/0055017 | A1* | 2/2016 | Beveridge | G06F 9/45558 |
| | | | | 718/1 |
| 2016/0098285 | A1* | 4/2016 | Davis | G06F 9/45545 |
| | | | | 718/1 |
| 2016/0337104 | A1* | 11/2016 | Kalligudd | H04W 76/10 |
| 2016/0366187 | A1* | 12/2016 | Kamble | H04L 63/20 |
| 2018/0239624 | A1* | 8/2018 | Tsirkin | G06F 9/45558 |

OTHER PUBLICATIONS

Van De Ven, Arjan, An Introduction to Clear Containers, Mar. 18, 2015 (21 pages) Link: https://twn.net/Articles/644675/.

Re: What is Kdeinit for?, Jul. 25, 2004 (2 pages) Link: http://marc.info/?l=kde-optimize&m=109076501216044&w=2.

* cited by examiner

TRANSPARENT FAST APPLICATION LAUNCHER

BACKGROUND

The present disclosure generally relates to starting executable programs in computer systems. Many typical executable programs incorporate shared libraries to perform various tasks for a variety of reasons, including ease of development, compliance with standards, and reusability of code. A significant part of loading an executable program for execution includes the loading of the shared libraries incorporated in the executable program. The shared libraries typically provide a lot of the features needed for the executable program to perform its designed tasks.

SUMMARY

The present disclosure provides a new and innovative system, methods and apparatus for a transparent fast application launcher. In an example, an executable loader receives a first request to load a first copy of an executable program. In response to receiving the first request, the first copy of the executable program is loaded into a memory, including resolving at least one shared library associated with the executable program and loading the resolved shared library(ies) to the memory. A local socket is associated with the first copy of the executable program. An entry indicative of the local socket and the first executable program is recorded in an executable database. A second request to load a second copy of the executable program is received by the executable loader, which then connects to the local socket as a client and sends a third request to the local socket based on the second request to launch the second copy of the executable program, where the second copy of the executable program executes responsive to the local socket receiving the third request.

Additional features and advantages of the disclosed method and apparatus are described in, and will be apparent from, the following Detailed Description and the Figures.

DETAILED DESCRIPTION OF EXAMPLE EMBODIMENTS

Figure 1:
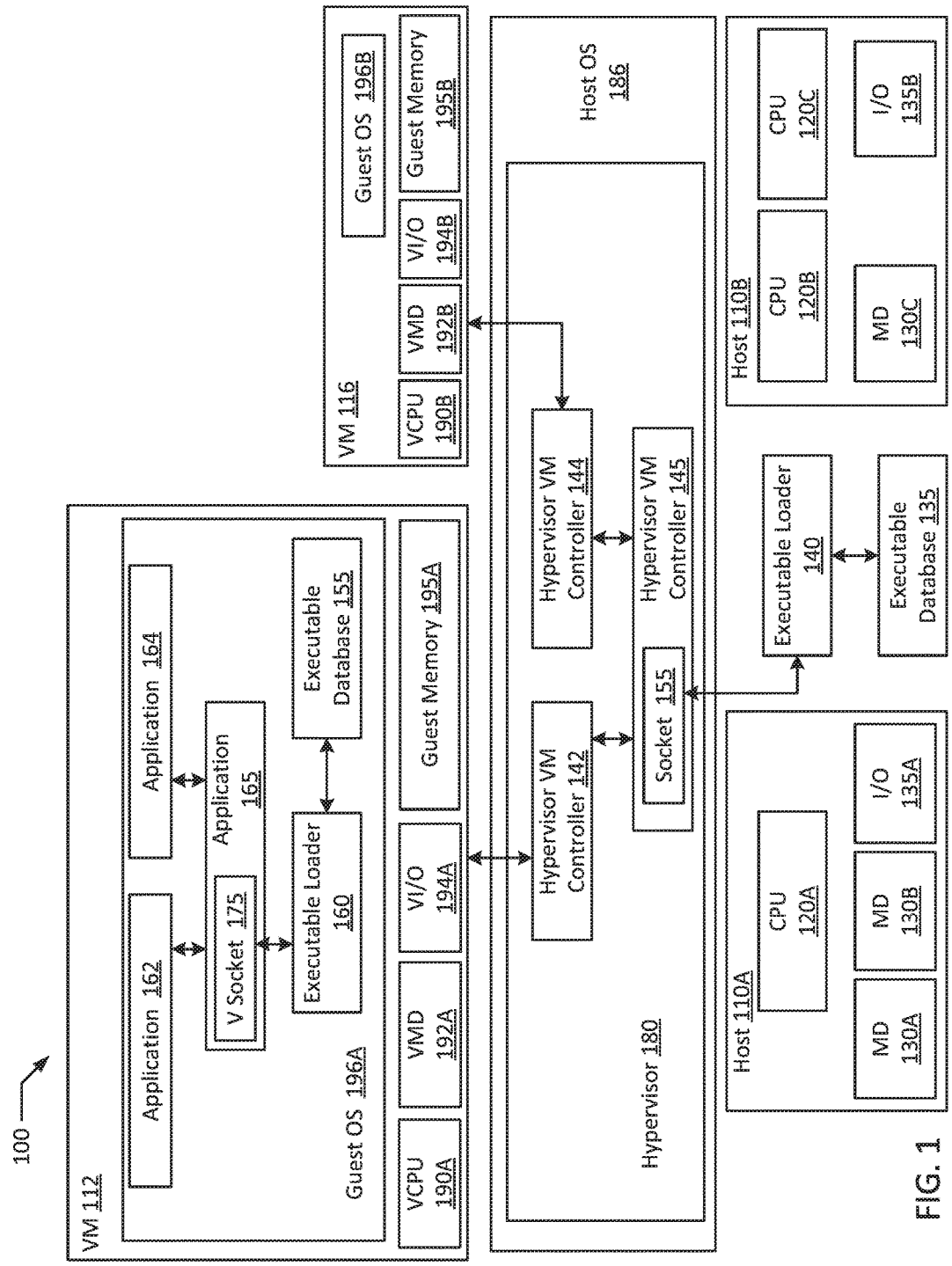
FIG. 1 is a block diagram of a system employing a transparent fast application launcher according to an example of the present disclosure.

In computer systems, executable programs are typically built by incorporating multiple shared libraries into a binary executable file, the shared libraries generally being loaded to Random Access Memory ("RAM") prior to executing code in the shared libraries. The aggregate size of the shared libraries incorporated in an executable program tends to impact the time required for the executable program to start. In part because these shared libraries tend to comprehensively cover functionality of a particular type (e.g., network transmissions or support for a particular programming language), shared libraries tend to include more features than a particular executable program incorporating the shared library need. A result is that loading shared libraries into memory tends to account for a significant amount of the startup time for an executable program. The share of the startup time for an executable program that loading shared libraries represents depends in part on the quantity and the size of the shared libraries incorporated. In some systems, shared libraries may be loaded into RAM in a fixed location, with executable programs linking themselves to the copy of the shared library already loaded in RAM upon launch rather than loading a separate copy of the shared library. By maintaining a list of reference locations in the memory for these previously loaded shared libraries, startup times for executable programs such as applications may be significantly improved. However, with these types of optimizations using static locations for shared libraries in the memory, there are increased security risks for the system because enforcing static memory locations disables security features such as address space layout randomization ("ASLR").

A commonly exploited security flaw in computer systems relates to exploiting buffer overflow events. A malicious actor may purposefully over run a fixed sized buffer to place data in an area in memory that should not have been accessible to the malicious actor's programming. If the location in memory of certain routinely used libraries is discoverable, return addresses in the call stack of the library may be replaced with a pointer to an address of alternative code placed in memory by the malicious actor. A typical scenario may involve discovering the location in memory of a shared library executing with higher privileges than the malicious actor has been able to obtain access to on the computer system, and then to redirect certain common functionality of the library to replacement code of the malicious actor's choosing by deliberately triggering a buffer overflow event that overflows onto the privileged library from a non-privileged location in memory. ASLR impedes these types of attacks by randomizing the locations in memory for shared libraries and parts of shared libraries each time an executable program is loaded into memory. However, in systems where one copy of a shared library is preloaded into the memory at a static location which is then "prelinked" to each new executable program referencing the shared library, ASLR cannot function because the shared library is not being reloaded to a random location. A malicious actor may then discover the location in memory of a shared library that is commonly used with elevated rights (e.g., libc, a library for generating the runtime environment for code written in the c programming language commonly used in operating system components), and use that location information target memory addresses for an attack. Due to the conflict between "prelinking" and ASLR, administrators of computer systems generally have to choose between faster performance in the form of faster application loading from implementing a "prelinking" style of preloading shared libraries in memory versus higher security against attack by implementing ASLR.

In addition, a system that allows copies of an application to share a shared library already loaded into memory may require special means of invoking the various copies of the application. For example, in some systems, a special preloading application may be run that incorporates a variety of commonly used shared libraries in the system, and that special preloading application may then be used as an intermediary to quickly load and execute other executable programs sharing the preloaded libraries. However, usage of such systems generally require an extra application to be invoked. A user would first need to know of the extra application, would need to configure the application, and then would need to use the application to preload shared libraries for an executable program and to recognize the executable program. After the configuration steps are complete, the user would generally need to launch their executable programs using specific commands to the extra application rather than a standard, portable way of launching the executable program, thereby requiring special consideration whether the application is available in any particular environment. Therefore, the performance advantages from such a system rely on users knowing about the special preloading application and using the special preloading application properly, two factors that reduce the usage rate and advantages of the special preloading application. The special preloading application also then becomes a single source for the shared libraries of many different applications, and as a shared dependency, it defeats some of the security advantages of ASLR, similar to "prelinking" as discussed above, especially in cases where quickly launching new applications incorporating the shared libraries uses copy on write to lazily copy the shared libraries.

The present disclosure aims to address the balance between loading times, security concerns, and usability by employing a novel transparent fast application launcher. In an example, the present disclosure enables executable programs to be loaded with regularly refreshed ASLR while still having the shared libraries required by the executable programs be preloaded to the system memory in most situations. By initially loading a first copy of an executable program in a standby/server mode with ASLR active, it is possible for subsequent requests to execute the executable program to reference the shared libraries loaded to memory by the first copy of the executable program. Rather than sharing one copy of the shared library across an entire system using a static location for that shared library, copies of the shared library are shared instead by copies of the same program limiting the impact of a discovery of the location in memory of a shared library referenced by any one executable program. Usability is ensured through the addition of an executable loader, which processes requests to launch supported executable programs through preloaded standby/server mode copies of each executable program using the transparent fast application launcher. In an example, the executable loader may intercept a request to launch or execute an executable program and repackage the request in a manner compatible with the standby/server mode copy of the executable program, without any specific request to use the transparent fast application launcher. For example, a user unaware of the transparent fast application launcher may invoke an executable program as normal, but rather than the operating system directly loading and launching the executable program, the executable loader combined with a preloaded copy of the executable program load and launch the new copy of the executable program.

Furthermore, preferential embodiments of the present disclosure, additionally increase security by performing ASLR on the server versions of the executable program, thereby preventing stack overflow exploits targeting the impacted executable programs. Although the presently disclosed system incurs the overhead of executing at least one extra copy of the executable program, results from the present system's advantageous combination of speed and security justify the overhead. In addition, the amount of overhead may be tuned such that the actual overhead incurred would be less than the memory requirements of an operating additional full instance of the executable program. In some examples, storage space usage and memory I/O time may be further optimized by using a copy on write method for launching active mode versions of the executable program, such that only changes to what has previously been loaded to memory by the server copy of the executable program need to be written, unchanged data may instead be read and shared from the original copy loaded to memory.

FIG. 1 is a block diagram of a system employing a transparent fast application launcher according to an example of the present disclosure. The system 100 may include one or more interconnected hosts (e.g., hosts 110A-B). Each host 110A-B may in turn include one or more physical processors (e.g., CPU 120A-C) communicatively coupled to memory devices (e.g., MD 130A-C) and input/output devices (e.g., I/O 135A-B). As used herein, physical processor or processors (Central Processing Units "CPUs") 120A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 135A-B refers to a device capable of providing an interface between one or more processor pins and an external device, the operation of which is based on the processor inputting and/or outputting binary data. CPUs 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 135A may be provided by one or more local buses of suitable architecture, for example, peripheral component interconnect (PCI).

In computer systems (e.g., system 100), it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a virtual machine ("VM") (e.g., VMs 112 and 116) may be a robust simulation of an actual physical computer system utilizing a hypervisor to allocate physical resources to the virtual machine.

In an example, hosts 110A-B may run one or more isolated guests in the form of virtual machines VM 112 and VM 116, by executing a software layer (e.g., hypervisor 180) above the hardware and below the VMs 112 and 116, as schematically shown in FIG. 1. In an example, the hypervisor 180 may be components of the host operating system 186 executed by the system 100. In another example, the hypervisor 180 may be provided by an application running on host operating system 186, or may run directly on the hosts 110A-B without an operating system beneath it. The hypervisor 180 may virtualize the physical layer, including processors, memory, and I/O devices, and present this virtualization to VMs 112 and 116 as devices, including virtual processors ("VCPUs") 190A-B, virtual memory devices ("VMDs") 192A-B, virtual I/O devices ("VI/Os") 194A-B, and/or guest memory 195A-B. In an example, a VM 112 may be a virtual machine and may execute a guest operating system ("OS") 196A which may utilize the underlying virtual central processing unit ("VCPU") 190A, virtual memory device ("VMD") 192A, and virtual input/output ("VI/O") devices 194A. Processor virtualization may be implemented by the hypervisor 180 scheduling time slots on one or more physical processors 120A-C such that from the guest operating system's perspective those time slots are scheduled on a virtual processor 190A.

A VM 112 may run on any type of dependent, independent, compatible, and/or incompatible applications on the underlying hardware and host operating system 186. In an example, guest OS 196A and applications 162 and 164 running on VM 112 may be independent of the underlying hardware and/or host operating system 186. Additionally, guest OS 196A and applications 162 and 164 running on VM 112 may be incompatible with the underlying hardware and/or host operating system 186. The hypervisor 180 manages memory for the host operating system 186 as well as memory allocated to the VM 112 and guest operating system 196A such as guest memory 195A provided to guest OS 196A. In an example, VM 116 may be another virtual machine similar in configuration to VM 112, with VCPU 190B, VMD 192B, VI/O 194B, guest memory 195B, and guest OS 196B operating in similar roles to their respective counterparts in VM 112. In some examples, various components of system 100, for example, host 110A and host 110B may reside over a network from each other, which may be, for example, a public network (e.g., the Internet), a private network (e.g., a local area network (LAN) or wide area network (WAN)), or a combination thereof.

In an example, hypervisor 180 may include a hypervisor virtual machine controller (e.g., hypervisor virtual machine controllers 142, 144, and 145). Hypervisor virtual machine controllers 142, 144, and 145 are executable programs performing part of the tasks of hypervisor 180 executing in the user space of hosts 110A-B. In an example, a hypervisor virtual machine controller (e.g., hypervisor virtual machine controller 142 and 144) may be a stand alone executable program associated with hypervisor 180. In an example, hypervisor virtual machine controller 142 may be a component part of hypervisor 180. In another example, a hypervisor virtual machine controller may function as a stand alone hypervisor. In an example, each of hypervisor virtual machine controllers 142 and 144 may be associated with a respective virtual machine (e.g., VMs 112 and 116), and may provide VM specific configuration settings and configuration capabilities for a particular VM. In an example, hypervisor virtual machine controller 142 may be associated with VM 112, and hypervisor virtual machine controller 144 may be associated with VM 116. In an example of a transparent fast application launcher, hypervisor virtual machine controller 145 may be in a passive standby/server mode providing fast startup for other copies of the hypervisor virtual machine controller executable program (e.g., hypervisor virtual machine controllers 142 and 144). In an example, hypervisor virtual machine controllers 142 and 144 may be in an active/executing mode providing configurations for VMs 112 and 116. In an example, while in standby/server mode, hypervisor virtual machine controller 145 listens for instructions on socket 155. In an example, socket 155 may be any form of communication channel by which hypervisor virtual machine controller 145 may listen for instructions. In an example, socket 155 may be operating system components (e.g., UNIX® domain sockets) implemented, for example, through sharing access to a particular area of the file system of system 100 between various parties in a communication. In another example, socket 155 may be implemented as a network socket using Internet Protocol ("IP"), Transmission Control Protocol ("TCP"), User Datagram Protocol ("UDP") or any other protocol. In an example, socket 155 may be ports accessible to external systems.

In an example, an executable loader 140 may be any form of computer program (e.g., a binary executable, a script, a batch file, a macro, or a link) that may reinterpret a request to execute an executable program (e.g., hypervisor virtual machine controller 142 and 144) into a format where the request may be sent to a socket (e.g., socket 155) associated with a standby/server mode version of the same executable program (e.g., hypervisor virtual machine controller 145). In an example, executable loader 140 may be communicatively coupled with socket 155 and with executable database 135 over a network. In some examples, executable loader 140, hypervisor virtual machine controller 145, and executable database may reside in the same computer system (e.g., system 100). In an example, executable database 135 may contain connection information (e.g., a location of socket 155) and/or configuration information for each executable program that is launched by executable loader 140. In an example, the executable database 135 may be stored in any suitable type of database, for example a relational database. The executable database 135 may be stored in a database associated with a database management system (DBMS). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, the executable database 135 may be stored in a database organized as a formal database with a schema such as a relational schema with defined tables, indices, links, triggers, various commands etc. In some examples, executable database 135 may not be organized as a formal database, but may instead be an alternative storage structure capable of holding the information stored in executable database 135, including but not limited to a file, folder, directory, registry, etc. In some examples, executable loader 140, executable database 135, host 110A and host 110B may reside over a network from each other, which may be, for example, a public network (e.g., the Internet), a private network (e.g., a local area network (LAN) or wide area network (WAN)), or a combination thereof. In an example, executable loader 140, combined with a supported executable program executing in a standby/server mode listening on a socket (e.g., hypervisor virtual machine controller 145), combine to execute as a transparent fast application launcher for new copies of hypervisor virtual machine controllers. In an example, executable loader 140 may further support the transparent fast launching of a plurality of other executable programs, each executable program having at least one copy executing in a standby/server mode listening for instructions on a socket.

In an example, applications 162, 164 and 165 represent a second executable program taking advantage of a second executable loader (e.g., executable loader 160) acting as a transparent fast application launcher within VM 112. In the example, executable loader 160 may be communicatively coupled with a second executable database 155 and also with application 165 executing in a standby/server mode, where application 165 listens for instructions through a virtual socket 175. In the example, application 162 and application 164 may be active/executing copies of the second executable program. In an example, applications 162, 164, and 165 may be unaware that they are executing within a virtualized environment. Virtual socket 175 may be any form of communicative channel through which server mode copies of the executable program (e.g., application 165) may receive instructions to launch active mode copies of the executable program (e.g., application 162 and application 164). The applications 162, 164, and 165 may be any executable program that benefits from a transparent fast application launcher, including, for example, a compiler or runtime environment. In an example, executable loader 160, combined with a supported executable program executing in a standby/server mode listening on a socket (e.g., application 165), combine to execute as a transparent fast application launcher for new copies of application 165.

Figure 2:
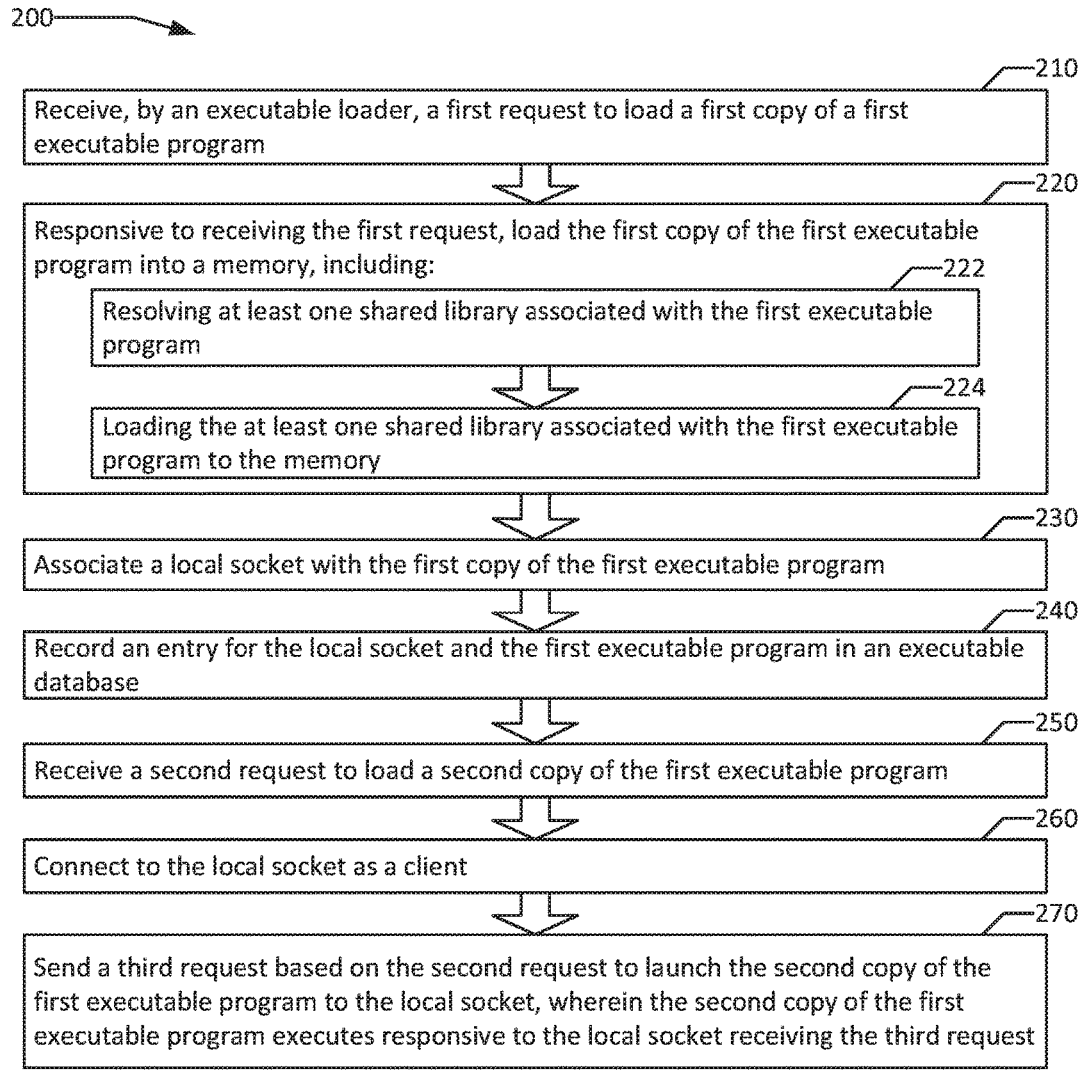
FIG. 2 is a flowchart illustrating an example of a transparent fast application launcher according to an example of the present disclosure.

FIG. 2 is a flowchart illustrating an example of a transparent fast application launcher according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the method is performed by executable loader 140.

The example method 200 may begin with receiving, by an executable loader, a first request to launch a first copy of an executable program (block 210). In an example, executable loader 140 may receive an instruction to launch an executable program (e.g., a hypervisor virtual machine controller) in a standby/server mode in preparation for launching future copies of hypervisor virtual machine controllers in an active/operational mode. In some examples, executable loader 140 may be started as part of a startup sequence for system 100. In the examples, the executable loader 140 may also receive a list of configured executable programs that require a standby/server mode copy to be preloaded as part of the system startup in anticipation of requests for active/operational copies of those executable programs. In an example, the list of configured executable programs may be found in executable database 135. In an example, the request to launch an initial copy of a hypervisor virtual machine controller in the standby/server mode (e.g., hypervisor virtual machine controller 145) may be part of the startup or initialization of the system 100 and/or executable loader 140. In an example, executable loader 140 may launch a copy of an executable program in standby/server mode based on a determination that no copy of the executable program is currently executing in the standby/server mode. For example, hypervisor 180 may receive a request for a new VM (e.g., VM 112), and may determine that launching VM 112 requires the launch of additional executable programs including a new hypervisor virtual machine controller 142 to manage configurations for the new VM 112. In the example, hypervisor 180 may send a request to host OS 186 to launch a hypervisor virtual machine controller, and the request may be intercepted by executable loader 140 based on hypervisor virtual machine controllers being among the executable programs executable loader 140 is configured to launch. In an example, receiving a request to launch a new copy of a hypervisor virtual machine controller may trigger executable loader 140 to determine that there is no available hypervisor virtual machine controller executing in a standby/server mode which may be used to speed up the launch of hypervisor virtual machine controller 142. For example, executable loader 140 may query executable database 135 for a location for socket 155 and determine that hypervisor virtual machine controller 145 is not currently running due to a lack of an entry for socket 155. In an example, executable loader 140 may interpret an implicit request to launch a hypervisor virtual machine controller in standby/server mode (e.g., hypervisor virtual machine controller 145) to handle the request from hypervisor 180 to launch a new hypervisor virtual machine controller in active/operational mode. In other examples, a request to launch a hypervisor virtual machine controller in standby/server mode may be sent to executable loader 140 directly from host OS 186 or hypervisor 180.

In response to receiving the first request, the first copy of the first executable program is loaded into a memory (block 220). In the example, executable loader 140 may launch hypervisor virtual machine controller 145 as a first copy of a hypervisor virtual machine controller stored in memory devices 130A-C, including loading shared libraries used by hypervisor virtual machine controllers into memory devices 130A-C. In an example, initial settings such as arguments or argument values (e.g., argv) and environment values (e.g., env) for hypervisor virtual machine controller 145 may be stored in executable database 135. In addition, connection information for hypervisor virtual machine controller 145 may be recorded in executable database 135 after hypervisor virtual machine controller 145 binds socket 155 as its communication channel. In an example, hypervisor virtual machine controller 145 is executing in a standby/server mode, where rather than performing the designed tasks for a hypervisor virtual machine controller (e.g., providing a VM with configuration settings), the hypervisor virtual machine controller 145 preloads shared libraries used by hypervisor virtual machine controllers and listens for further instructions on socket 155. In an example, hypervisor virtual machine controller 145 may be launched as part of a startup routine of system 100. In an example, launching hypervisor virtual machine controller 145 may include loading hypervisor virtual machine controller 145 to memory device 130A, including shared libraries incorporated in hypervisor virtual machine controller 145. In an example, launching hypervisor virtual machine controller 145 includes performing address space layout randomization for the memory used by hypervisor virtual machine controller 145. In an example, hypervisor virtual machine controller 145 is a preloaded hypervisor virtual machine controller executing in a standby/server mode awaiting instructions to launch active/operational copies of hypervisor virtual machine controllers through cloning.

In an example, loading the first copy of the first executable program into memory additionally includes first resolving at least one shared library associated with the first executable program (block 222). For example, loading hypervisor virtual machine controller 145 to memory devices 130A-C may include resolving a libc library for providing a runtime environment for code in the C programming language. In an example, after resolving at least one shared library, the at least one shared library is loaded into memory along with the first executable program (block 224). For example, a version of libc is loaded into memory devices 130A-C and additionally linked with hypervisor virtual machine controller 145. In some examples, executable loader 140 may also pre-initialize some shared libraries (e.g., libc) in addition to preloading the shared libraries. A determination on whether to pre-initialize a certain shared library may be based on environment settings, environment values, user settings, or configuration settings. Pre-initializing may provide further performance gains at the cost of some additional overhead. However, different copies of active mode hypervisor virtual machine controllers may require initialization of various shared libraries with different settings, so pre-initialization may actually be disadvantageous in some cases if re-initialization is required due to differences in settings. In an example, executable loader 140 may be configured to speed up the launching of a plurality of executable programs. For example, executable programs requiring numerous and/or large shared libraries may benefit from being launched by executable loader 140 rather than being launched directly by host OS 186. In an example, executable loader 140 may be configured to support launching executable programs such as hypervisors and hypervisor components, runtime environments (e.g., Java®, C#®), shells (e.g., bash, csh, ksh, powershell), compilers, or whole VM image files for commonly used VMs.

In an example, a local socket is associated with the first copy of the first executable program (block 230). For example, socket 155 is associated with hypervisor virtual machine controller 145. In an example, after being associated with hypervisor virtual machine controller 145, messages sent to socket 155 may be received by hypervisor virtual machine controller 145. In an example, binding socket 155 is indicative of hypervisor virtual machine controller 145 executing in a standby/server mode rather than an active operational mode. In an example, socket 155 may be any form of communication channel by which hypervisor virtual machine controller 145 may listen for instructions, including but not limited to a socket, a port, a queue, a file, or a shared file storage space. In an example, executable loader 140 may send an instruction to socket 155 to launch hypervisor virtual machine controller 142.

In an example, an entry may be recorded for the local socket and the first executable program in an executable database (block 240). For example, executable database 135 may contain entries corresponding to executable programs (e.g., hypervisor virtual machine controllers, compilers, and other runtime environments) for which executable loader 140 acts as a transparent fast application loader. In an example, an entry in executable database 135 may contain identifying information for copies of the executable program running in a standby/server mode (e.g., associated socket, process ID, inode, memory addresses, executable path). In an example, executable loader 140 may identify that a request is a request to launch an additional copy of an application with a standby/server mode copy already running based on the identifying information, such as the executable path. An example executable loader 140 may be configured to speed up the launch of the "bash" shell in system 100. In an example, executable loader 140 may need to confirm whether a request to execute "bash" is a request to execute the particular executable program file for "bash" that executable loader 140 is configured to support. For example, executable loader 140 may determine that an attempt to execute "bash" is an attempt to execute "/bin/bash" based on executable database 135. In another example, executable loader 140 may determine that an attempt to execute "bash" is an attempt to execute "/bin/bash" based on executable database 135 in conjunction with other information available from system 100, such as a standard path which may indicate that the first copy of "bash" found by the system would be the copy in the "Thin" directory. In another example, executable loader 140 may determine that a request to launch "/usr/bin/bash" is not a request to launch a supported executable program based on identifying characteristics of the file "/usr/bin/bash" (e.g., a checksum, file size, or location in non-transitory storage), and therefore executable loader 140 may ignore the request allowing host OS 186 to handle the request. In an example, an entry in executable database 135 for a given executable program may additionally contain fields and/or subentries with user or account specific data. For example, specific argument values (e.g., argv) and environment values (e.g., env) for a given user may be stored in executable database 135 for hypervisor virtual machine controllers, such that when a given user requests a new hypervisor virtual machine controller, executable loader 140 may pass on user specific settings to hypervisor virtual machine controller 145 to launch a new hypervisor virtual machine controller with custom settings.

In an example, a second request to load a second copy of the first executable program is received (block 250). For example, executable loader 140 may receive a request from hypervisor 180 to launch a copy of a hypervisor virtual machine controller (e.g., hypervisor virtual machine controller 142) executing in an active/operational mode. In an example, whether or not a copy of a hypervisor virtual machine controller is executing in the standby/server mode (e.g., hypervisor virtual machine controller 145) may be transparent to the user, as hypervisor virtual machine controller 145 may not be responsible for any tasks with tangible feedback to the user. In some examples, the user may not have sufficient permissions or privileges to determine whether an executable program is executing with elevated rights (e.g., an executable program executing in standby/server mode shared between multiple different user accounts with varied permissions). In an example, a user may only request active/operational copies of an executable program to be launched. In an example, the request to launch hypervisor virtual machine controller 142 may be an entirely separate request from the request to launch hypervisor virtual machine controller 145. In an example, the request to launch hypervisor virtual machine controller 145 and the request to launch hypervisor virtual machine controller 142 may be found in different parts of the same request message. In some examples, executable loader 140 may infer a request to first launch hypervisor virtual machine controller 145 upon receiving a request to launch an active/operational hypervisor virtual machine controller 142 based on a determination that no standby/server mode hypervisor virtual machine controller is currently executing. In an example where no standby/server mode hypervisor virtual machine controller is currently running, the request to launch hypervisor virtual machine controller 142 in an active/operational mode may include operational execution instructions that are converted into instructions sent to port 155 associated with hypervisor virtual machine controller 145 for the launching of hypervisor virtual machine controller 142. In an example, operational execution instructions may be in the form of a command line input, a file input, a queue input, and an environment value. In some examples, the operational execution instructions may be found in executable database 135. In an example, executable loader 140 determines that the request to launch hypervisor virtual machine controller 142 is a request to launch a second copy of a hypervisor virtual machine controller based on an executable path, an environment value, a security attribute, or data in the executable database 135.

The executable loader connects to the local socket as a client (block 260). In an example, executable loader 140 may maintain an active connection with socket 155 and hypervisor virtual machine controller 145 in anticipation of needing to communicate with hypervisor virtual machine controller 145. In another example, executable loader 140 initiates a connection with socket 155 upon receipt of a request to launch another hypervisor virtual machine controller, and the making of the determination that hypervisor virtual machine controller 145 is waiting in the standby/server mode to launch additional copies of hypervisor virtual machine controllers. In an example, executable loader 140 determines that socket 155 belongs to hypervisor virtual machine controller 145 based on information in executable database 135.

In an example, a third request based on the second request to launch the second copy of the first executable program is sent to the local socket, where the second copy of the first executable program executes in response to the local socket receiving the third request (block 270). For example, executable loader 140 may reinterpret a request from hypervisor 180 to launch a new hypervisor virtual machine controller into a request sent to local socket 155 requesting hypervisor virtual machine controller 145 to clone itself to create hypervisor virtual machine controller 142. In an example, hypervisor 180 may send a stored command line request for a new hypervisor virtual machine controller to host OS 186. In the example, rather than allowing host OS 186 to launch a new hypervisor virtual machine controller, executable loader 140 may intercept the request to host OS 186. In another example, hypervisor 180's request may be sent to executable loader 140 based on environment or path settings. In the above examples, the original request from hypervisor 180 may not be in a format compatible with hypervisor virtual machine controller 145 executing in the server mode, and therefore the request may require executable loader 140 to formulate a new request specifically for hypervisor virtual machine controller 145 to launch hypervisor virtual machine controller 142. In some examples, the reinterpreted request sent by executable loader 140 may include all or part of the request from hypervisor 180. For example, the request to launch hypervisor virtual machine controller 142 may include at least one argument value and/or environment value that is passed onto hypervisor virtual machine controller 142 such that hypervisor virtual machine controller 142 is launched with the at least one argument value and/or environment value. In some examples, these argument values and/or environment values may be sent to hypervisor virtual machine controller 145. In other examples, argument values and/or environment values may be stored in executable database 135.

In an example, argument values, environment values, and other settings may be included within a user profile or user specific information. Executable database 135 may be used to store user profiles and/or user specific information in relation to specific executable programs. In some examples, the request sent to local socket 155 may include user or permission settings, argv values and env values to be set for hypervisor virtual machine controller 142. In an example, cloning hypervisor virtual machine controller 145 may be achieved through the execution of commands such as clone( ), fork( ), spawn( ) or CreateProcess( ). In such examples, cloning methods that additionally support copy on write may be additionally advantageous due to further reduced loading of shared libraries, for example, by allowing hypervisor virtual machine controller 145 and hypervisor virtual machine controller 142 to share the same copy of a shared library until a change is required to be written to the memory block where the shared library is contained by either copy of the executable program, at which time the copy making the change would write to its own new memory block. In some examples, it has been demonstrated that cloning an already running copy of a hypervisor virtual machine controller is at least five percent faster than launching a hypervisor virtual machine controller directly. In an example system where a hypervisor virtual machine controller takes 200 to 300 ms to load, a transparent fast application launcher was able to consistently reduce load times by 10 to 15 ms. Larger savings may be observed depending on the quantity and/or size of the shared libraries integrated into a particular executable program. Therefore, on systems hosting dozens of virtual machines, the additional memory usage overhead of keeping hypervisor virtual machine controller 145 in a standby/server mode occupies a significantly lower percentage of the total available memory capacity of the system than the performance gain. In some examples, where no hypervisor virtual machine controller is currently running, the instruction to launch hypervisor virtual machine controller 142 may be reinterpreted by the hypervisor 180 and/or executable loader 140 to be two instructions, a first instruction to launch hypervisor virtual machine controller 145 in standby/server mode, and a second instruction to launch hypervisor virtual machine controller 142 in an active/operational mode by cloning hypervisor virtual machine controller 145. In an example, executable loader 140 may be implemented in a transparent fashion, where a user who does not know of executable loader 140's existence may still benefit from the performance enhancements of executable loader 140. In the example, the user may elect to directly execute a hypervisor virtual machine controller without connecting to a hypervisor virtual machine controller executing in server mode. In the example, executable loader 140 may intercept that request and first load a hypervisor virtual machine controller in server mode (e.g., hypervisor virtual machine controller 145), before connecting to the hypervisor virtual machine controller in server mode (e.g., hypervisor virtual machine controller 145) as a client to instruct hypervisor virtual machine controller 145 to launch an active mode hypervisor virtual machine controller 142. In such an example, the first time a hypervisor virtual machine controller is requested, the request may take longer than expected, but each subsequent time a new hypervisor virtual machine controller is requested, there would be a standby/server mode hypervisor virtual machine controller available to launch a new active/operational hypervisor virtual machine controller. In some examples, a request for an active/operational executable program where a standby/server mode copy is unavailable may be treated by the executable loader 140 as two separate requests, one to start a standby/server mode copy of the executable program, and a second request to directly start an active/operational copy of the executable program. In an example, executable loader 140 may forward a request to start an active/operational copy of the executable program to host OS 186 while it starts a standby/server mode copy of the executable program.

In an example, hypervisor virtual machine controller 145 may launch with elevated rights (e.g., as root or admin). For example, the server mode version of the executable program may be required to act as a server for all users of the system. In such an example, part of the instructions to launch hypervisor virtual machine controller 142 may include user settings, and the hypervisor virtual machine controller 145 may temporarily assume the rights and environment settings of a less privileged user prior to cloning itself to launch hypervisor virtual machine controller 142. In an example, hypervisor virtual machine controller 145 preloads some or all of the shared libraries used by active mode hypervisor virtual machine controllers prior to launching any active mode hypervisor virtual machine controllers (e.g., hypervisor virtual machine controller 142 and hypervisor virtual machine controller 144).

In further examples, a transparent fast application launcher may be advantageous for a variety of application types in a variety of environments. For example, applications 162, 164 and 165 may be copies of a compiler (e.g., gcc). In an example, application 165 may be executing in a standby/server mode (e.g., listening for requests to launch active copies of the compiler), while applications 162 and 164 may be executing in an active mode (e.g., actively compiling code). In another example, application 162, 164 and 165 may each be a component part of one or more compilers. A user may retrieve uncompiled code from the internet, which may possibly contain malicious code. Rather than risk infecting a physical system, the user may wish to perform tests on the code in a VM 112 that may be terminated if the code turns out to be malicious, with relatively little risk of infection to host OS 186 or other VMs of system 100 (e.g., VM 116). Desiring to test compile many such pieces of questionable code, it may be advantageous to configure executable loader 160 to launch application 165 in server mode listening for instructions on virtual socket 175. In an example, information pertaining to applications 162, 164 and 165 may be stored in executable database 155. Application 165 may be an executable program such as a compiler that is then fed an instruction to compile a file containing questionable code. In an example, application 165 may fork itself with the file containing questionable code as an input variable to launch application 162, which may then compile the questionable code. Application 165 may fork itself again with a new file containing questionable code as an input variable to launch application 164 to compile the new file containing questionable code.

Figure 3:
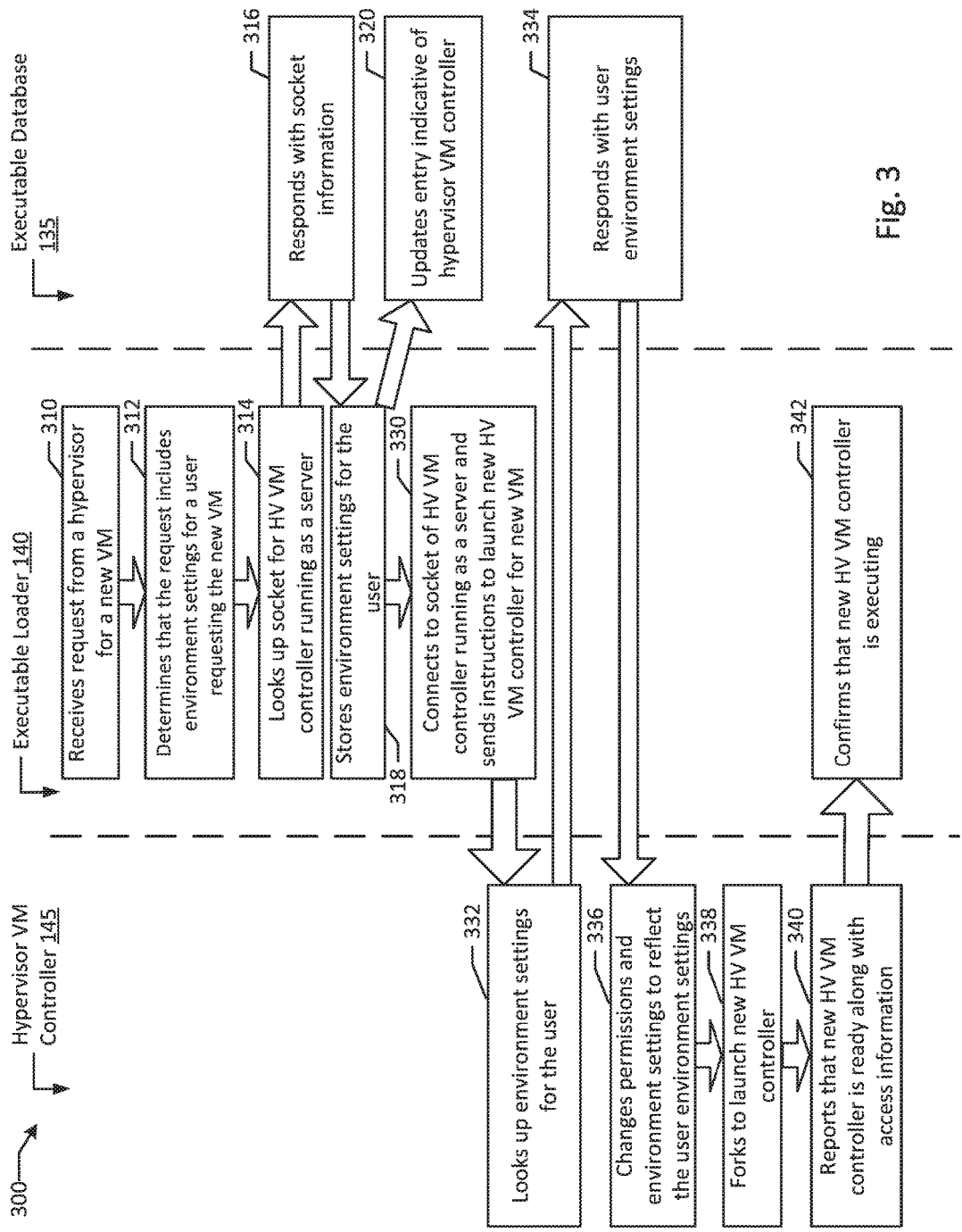
FIG. 3 is a flow diagram illustrating an example system employing a transparent fast application launcher according to an example of the present disclosure.

FIG. 3 is a flow diagram illustrating an example system employing a transparent fast application launcher according to an example of the present disclosure. Although the examples below are described with reference to the flowchart illustrated in FIG. 3, it will be appreciated that many other methods of performing the acts associated with FIG. 3 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 300, an executable loader 140 is a transparent fast application launcher communicatively coupled with an executable database 135 and hypervisor virtual machine controller 145.

Hypervisor 180 may send a request to executable loader 140 to launch a new VM. Executable loader 140 may receive the request from hypervisor 180 for a new VM (block 410). As a result of the request, executable loader 140 may parse the request from hypervisor 180 to determine specific instructions for the launch of a new hypervisor virtual machine controller to support and configure the new VM. Executable loader 140 may determine that the request includes environment settings for a user requesting the new VM (block 312). In an example, executable loader 140 may look up the socket for hypervisor virtual machine controller 145 running in server mode on executable database 135 (block 314). In the example, executable database 135 may respond to the query from executable loader 140 with socket information for socket 155 (block 316). In an example, based on receiving information relating to socket 155, executable database 135 may determine that there is an instance of hypervisor virtual machine controller running in server mode (e.g., hypervisor virtual machine controller 145). Executable loader 140 may further determine that the environment settings for the user may be reusable in the future, and so the settings should be stored in a subentry for hypervisor virtual machine controller information on executable database 135. In an example, executable loader 140 stores environment settings for the user (block 318). As a result, executable database 135 updates the entry indicative of hypervisor virtual machine controllers with the environment settings for the user (block 320).

In an example, after the user environment settings are stored in executable database 135, executable loader 140 may connect to socket 155 of hypervisor virtual machine controller 145 running as a server, and send instructions through socket 155 to launch a new hypervisor virtual machine controller (e.g., hypervisor virtual machine controller 142) for VM 112 (block 330). In some examples, executable loader 140 may forward the user environment settings to hypervisor virtual machine controller 145 with its request for hypervisor virtual machine controller 142. In other examples, the instructions to launch hypervisor virtual machine controller 142 may include a reference to query executable database 135 for any required user settings. In an example, hypervisor virtual machine controller 145 looks up environment settings for the user in executable database 135 (block 332). In the example, executable database 135 may respond with the user environment settings stored by executable loader 140 (block 334). In an example, hypervisor virtual machine controller 145 changes permissions and environment settings to reflect the user environment settings (block 336). In an example, after environment settings are set, hypervisor virtual machine controller 145 forks itself to launch new hypervisor virtual machine controller 142 (block 338). In some examples, hypervisor virtual machine controller 145 may fork itself prior to implementing environment settings, and instead pass the environment settings and/or other instructions to the new child process after the forking process is complete. After the new hypervisor virtual machine controller is independently executing, hypervisor virtual machine controller 145 may report to executable loader 140 that the new hypervisor virtual machine controller (e.g., hypervisor virtual machine controller 142) is ready along with reporting access information for hypervisor virtual machine controller 142 to executable loader 140 (block 340). In an example, executable loader 140 may independently confirm that the new hypervisor virtual machine controller is executing (block 342).

In some example, the operation to launch hypervisor virtual machine controller 142 may be a copy on write application, where the memory segments of hypervisor virtual machine controller 145 are instead flagged as copy on write, avoiding a requirement to actually rewrite all of the memory segments of hypervisor virtual machine controller 145 to memory again unless they are changed by either hypervisor virtual machine controller 145 or hypervisor virtual machine controller 142. In the example, the shared libraries required by hypervisor virtual machine controller 142 to execute its tasks may be initialized based on argv and env values passed to hypervisor virtual machine controller 142. The new child process for hypervisor virtual machine controller 142 may then execute (e.g., run exec( ) on) the hypervisor virtual machine controller executable program binary file resulting in hypervisor virtual machine controller 142 executing in active mode with shared libraries preloaded. In other examples, hypervisor virtual machine controller 142 may be launched as a child process of hypervisor virtual machine controller 145 through various related system operations to fork( ) such as clone( ), spawn( ) or CreateProcess( ).

In an example, executable loader 140 may periodically determine whether a new hypervisor virtual machine controller executing in server mode is necessary. For example, the determination may be made based on a quantity of child hypervisor virtual machine controllers (e.g., hypervisor virtual machine controller 142) launched by hypervisor virtual machine controller 145, or an uptime for the hypervisor virtual machine controller 145 process. In the example, extended uptime or a high quantity of child processes may be indications that ASLR for hypervisor virtual machine controllers should be refreshed for security reasons. In some examples, a decision regarding whether to, for example, restart hypervisor virtual machine controller 145 may be made based on data in executable database 135. For example, as the processes storing settings data in executable database 135 increase, executable database 135 may need to be purged for performance reasons. In an example, purging executable database 135 may be a trigger to restart all of the executable programs (e.g., hypervisor virtual machine controller 145 and in some examples, application 165) executing in a standby/server mode with entries in executable database 135 once executable database 135 is reinitialized to ensure that all of the executable programs have up to date connection information including socket information stored in executable database 135. In an example, it may be advantageous for executable database 135 to be shared with VMs executing in system 100 because a copy of a shared library may be loaded to memory devices 130A-C either directly by an executable program executing on host OS 186, or through virtualization on guest OS's 196A-B. In the example, rather than loading a shared library from non-transitory storage to memory devices 130A-C, executable loaders 140 and 160 may utilize a copy of the shared library loaded by another VM (e.g., VM 116) by, for example, setting the existing copy of the shared library in memory devices 130A-C to copy on write. In some examples, specific entries relating to specific executable programs may become deprecated or inaccurate, in which case the specific entry may be purged. As a result of purging the specific entry (e.g., the entry for hypervisor virtual machine controllers), any then running hypervisor virtual machine controllers in the server mode (e.g., hypervisor virtual machine controller 145) may need to be restarted to recreate an entry in the executable database 135. In an example, purging an entry in the executable database 135 triggers the termination of any executable program associated with the entry. In another example, executable database 135 may store identifying information for an executable program (e.g., hash, checksum or size data), and executable loader 140 may determine upon querying executable database 135 that the current copy of a binary file for an executable program is different from the copy used to launch the server mode copy of the executable program whose information was stored in the executable database 135. In such an example, the currently executing copy of the executable program may no longer be an accurate template for new copies since the executable program may have been updated in the interim, and therefore the currently executing copy may be terminated and/or restarted with the new binary executable file. In an example, any entries in executable database 135 associated with the executable program may also be purged. In other examples, triggers for the purging of the executable database may include an elapsed time since a previous purge, a memory usage of the executable database, and a quantity of requests sent to an executable program running in server mode. In an example, executable loader 140 determines that after hypervisor virtual machine controller 145 had been cloned a predetermined quantity of times (e.g., ten times) to launch hypervisor virtual machine controllers in the active mode, a new server mode hypervisor virtual machine controller is required for security purposes.

Figure 4:
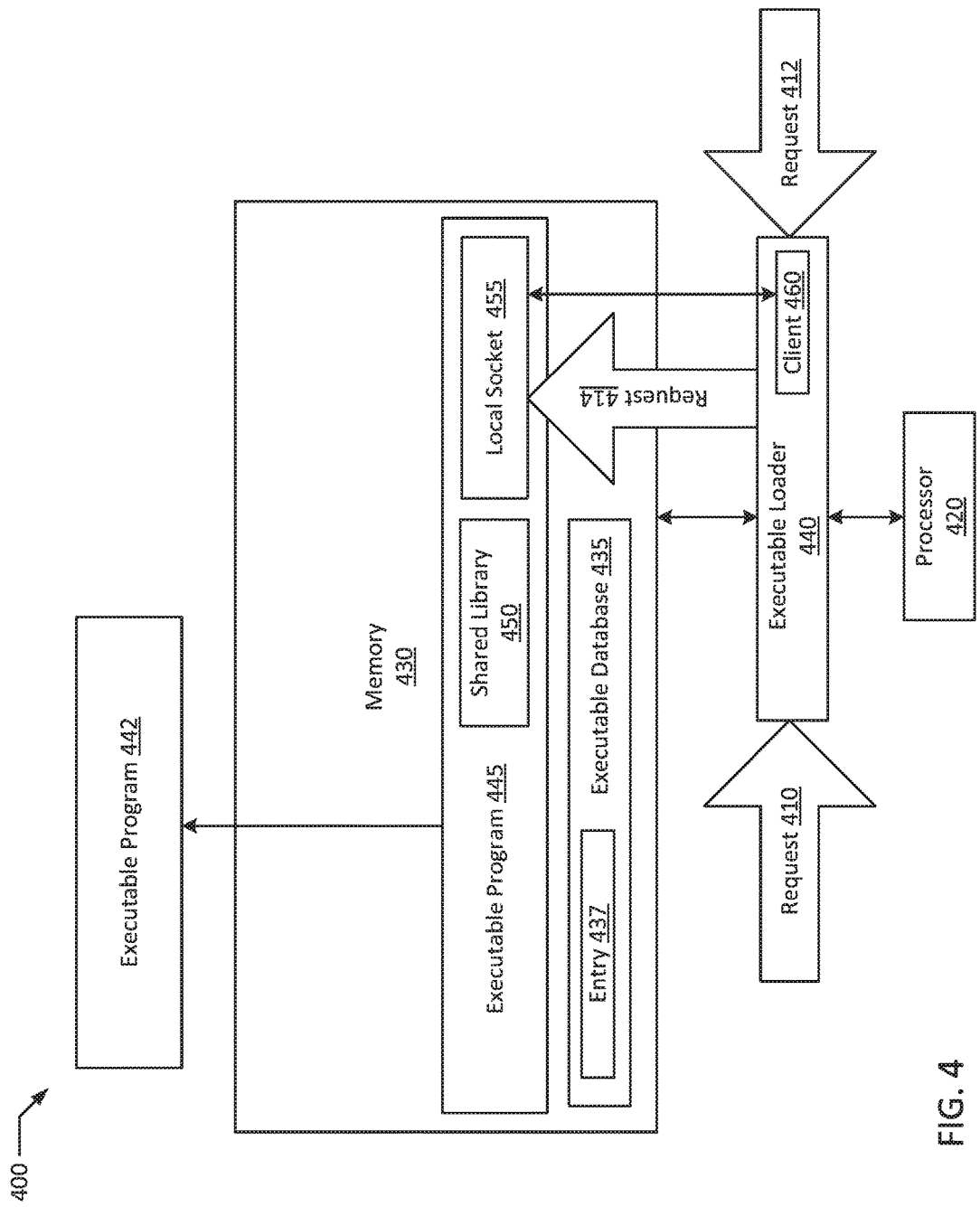
FIG. 4 is a block diagram of a system employing a transparent fast application launcher according to an example of the present disclosure.

FIG. 4 is a block diagram of a system employing a transparent fast application launcher according to an example of the present disclosure. Example system 400 may include a a memory 430 storing an executable database 435 connected to processor 420 with an executable loader 440 executing on processor 420. In an example, executable loader 440 receives a request 410 to load a first copy of an executable program 445. In response to receiving request 410, executable loader 440 may load the first copy of the executable program 445 into the memory 430. Loading executable program 445 to memory 430 may include resolving a shared library 450 associated with executable program 445 and loading shared library 450 associated with executable program 445 to the memory 430. Executable loader 440 may then associate a local socket 455 with the first copy of the executable program 445. An entry 437 indicative of the relationship between local socket 455 and executable program 445 may be recorded in the executable database 435. Executable loader 440 may receive a request 412 to load a second copy of the executable program 442. In an example, executable loader 440 may connect to local socket 455 as a client 460 and send a request 414 based on request 412 to launch the second copy of the executable program 442 to the local socket 455, where the second copy of the executable program 442 executes responsive to the local socket 455 receiving request 414.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
an executable database stored in the memory, wherein the executable database is associated with a plurality of executable programs including the first executable program, each executable program of the plurality of executable programs respectively having an associated entry in the executable database including a first associated entry associated with the first executable program;
one or more processors;
an executable loader executing on the one or more processors to:
receive a first request to load a first copy of a first executable program;
responsive to receiving the first request, load the first copy of the first executable program into the memory, including:
resolving at least one shared library associated with the first executable program; and
loading the at least one shared library associated with the first executable program to the memory;
associate a local socket with the first copy of the first executable program;
record an entry indicative of the local socket and the first executable program in the executable database;
receive a second request to load a second copy of the first executable program;
connect to the local socket as a client; and
send a third request based on the second request to launch the second copy of the first executable program to the local socket, wherein the second copy of the first executable program executes responsive to the local socket receiving the third request, wherein the executable database is periodically purged, the first associated entry is purged independently of each other entry, purging the first associated entry triggers the termination of the first executable program, and a change to a binary file associated with the first executable program of the plurality of executable programs triggers purging of the first associated entry.

2. The system of claim 1, wherein the first copy of the first executable program acts as a server rather than executing operationally.

3. The system of claim 1, wherein the second request includes at least one of an argument value and an environment value passed to the second copy of the first executable program and the second copy of the first executable program is launched with the at least one of an argument value and an environment value.

4. The system of claim 1, wherein the second copy of the first executable program is one of cloned and forked from the first copy of the first executable program.

5. The system of claim 1, wherein a purging of the executable database is triggered based on at least one of an elapsed time, a memory usage, and a quantity of requests sent to the first copy of the first executable program.

6. The system of claim 1, wherein the executable loader determines that the second request is a request to launch a second copy of the first executable program based on at least one of an executable path, an environment value, and security attributes.

7. The system of claim 1, wherein the first request and the second request are parts of a same request message.

8. The system of claim 1, wherein the first request is implied from a receipt of the second request where the first copy of the first executable program is unlaunched.

9. The system of claim 1, wherein the first request includes operational execution instructions, and after launching the first copy of the first executable program, the executable loader converts the operational execution instructions into a fourth request to launch a third copy of the first executable program to execute operationally the operational execution instructions.

10. The system of claim 9, wherein the operational execution instructions are one of a command line input, a file input, a queue input, and an environment value.

11. The system of claim 1, wherein the entry in the executable database includes user specific information and the second copy of the first executable program is launched with settings based on the user specific information.

12. The system of claim 1, wherein the entry in the executable database includes environment values of the first executable program.

13. The system of claim 1, wherein the at least one shared library associated with the first executable program is initialized prior to the second copy of the first executable program being launched.

14. The system of claim 1, wherein the at least one shared library associated with the first executable program is initialized based on an environment value associated with the second copy of the first executable program.

15. A method comprising:
receiving, by an executable loader, a first request to load a first copy of a first executable program;
responsive to receiving the first request, loading the first copy of the first executable program into a memory, including:
resolving at least one shared library associated with the first executable program; and
loading the at least one shared library associated with the first executable program to the memory;
associating a local socket with the first copy of the first executable program;
recording an entry indicative of the local socket and the first executable program in an executable database, wherein the first request includes operational execution instructions that are one of a command line input, a file input, a queue input, and an environment value, and after launching the first copy of the first executable program, the executable loader converts the operational execution instructions into a second request to launch a second copy of the first executable program to execute operationally the operational execution instructions;
receiving a third request to load a third copy of the first executable program;
connecting to the local socket as a client; and
sending a fourth request based on the third request to launch the third copy of the first executable program to the local socket, wherein the third copy of the first executable program executes responsive to the local socket receiving the fourth request.

16. The method of claim 15, wherein the first copy of the first executable program acts as a server rather than executing operationally.

17. The method of claim 15, further comprising:
one of cloning and forking the first copy of the first executable program to launch the second copy of the first executable program.

18. The method of claim 15, wherein the executable database is associated with a plurality of executable programs including the first executable program, each executable program of the plurality of executable programs respectively having an associated entry in the executable database including a first associated entry associated with the first executable program, the method further comprising:
periodically purging the executable database, wherein purging the first associated entry triggers the termination of the first executable program, and a change to a binary file associated with the first executable program of the plurality of executable programs triggers purging of the first associated entry.

19. The method of claim 15, wherein the first request is implied from a receipt of the second request where the first copy of the first executable program is unlaunched.

20. A computer-readable non-transitory storage medium storing executable instructions, which when executed by a computer system, cause the computer system to:
receive, by an executable loader, a first request to load a first copy of a first executable program;
responsive to receiving the first request, load the first copy of the first executable program into a memory, including:
resolving at least one shared library associated with the first executable program; and
loading the at least one shared library associated with the first executable program to the memory;
associate a local socket with the first copy of the first executable program;
record an entry indicative of the local socket and the first executable program in an executable database, wherein the first request includes operational execution instructions, the operational execution instructions are one of a command line input, a file input, a queue input, and an environment value, and after launching the first copy of the first executable program, the executable loader converts the operational execution instructions into a second request to launch a second copy of the first executable program to execute operationally the operational execution instructions;
receive a third request to load a third copy of the first executable program;
connect to the local socket as a client; and
send a third fourth request based on the third request to launch the third copy of the first executable program to the local socket, wherein the third copy of the first executable program executes responsive to the local socket receiving the fourth request.

* * * * *

UNITED STATES PATENT AND TRADEMARK OFFICE
CERTIFICATE OF CORRECTION

PATENT NO. : 10,310,872 B2  
APPLICATION NO. : 15/438086  
DATED : June 4, 2019  
INVENTOR(S) : Michael Tsirkin Page 1 of 1

It is certified that error appears in the above-identified patent and that said Letters Patent is hereby corrected as shown below:

In the Specification  
In Column 10, Lines 18-19, replace "the "Thin" directory" with --the "/bin" directory--.

In the Claims  
In Column 20, Line 24 (Claim 20), replace "send a third fourth request" with --send a fourth request--.

Signed and Sealed this  
Thirtieth Day of July, 2019

Andrei Iancu  
*Director of the United States Patent and Trademark Office*